(12) United States Patent
Hansson et al.

(10) Patent No.: US 7,068,438 B2
(45) Date of Patent: Jun. 27, 2006

(54) GRIN-LENS ARRANGEMENT

(75) Inventors: Renée Hansson, Stockholm (SE);
Stefan Spiekermann, Järfälla (SE);
Håkan Karlsson, Stockholm (SE)

(73) Assignee: Cobalt AB, Stockholm (SE)

( * ) Notice: Subject to any disclaimer, the term of this patent is extended or adjusted under 35 U.S.C. 154(b) by 0 days.

(21) Appl. No.: 10/513,821

(22) PCT Filed: May 16, 2003

(86) PCT No.: PCT/SE03/00790

§ 371 (c)(1),
(2), (4) Date: Jan. 4, 2005

(87) PCT Pub. No.: WO03/098283

PCT Pub. Date: Nov. 27, 2003

(65) Prior Publication Data

US 2005/0168827 A1    Aug. 4, 2005

(30) Foreign Application Priority Data

May 17, 2002    (SE)    .................................... 0201486

(51) Int. Cl.
*G02B 3/00*    (2006.01)
*G02B 9/00*    (2006.01)

(52) U.S. Cl. ...................... 359/652; 359/710; 359/721

(58) Field of Classification Search ........ 359/652–654, 359/708, 710, 716; 369/112.23, 112.24, 369/112.25, 112.26
See application file for complete search history.

(56) References Cited

U.S. PATENT DOCUMENTS

| 5,369,661 | A |   | 11/1994 | Yamaguchi et al. |
| 5,790,314 | A | * | 8/1998 | Duck et al. ................. 359/654 |
| 6,014,270 | A | * | 1/2000 | Bergmann et al. .......... 359/710 |
| 6,088,166 | A |   | 7/2000 | Lee |
| 2002/0054428 | A1 | * | 5/2002 | Seward ....................... 359/362 |

* cited by examiner

*Primary Examiner*—Jordan M. Schwartz
(74) *Attorney, Agent, or Firm*—Buchanan Ingersoll PC

(57) ABSTRACT

A lens arrangement for transforming a divergent, generally astigmatic laser beam from a diode laser into a beam having a high degree of rotational symmetry is disclosed. The arrangement comprises, in series, a first cylindrical gradient index lens arranged with its principal axes parallel to the principal axes of the astigmatic laser beam; a second cylindrical gradient index lens arranged with its principal axes parallel to the principal axes of the astigmatic laser beam; and a third cylindrical gradient index lens arranged with its principal axes rotated 45 degrees with respect to the principal axes of the astigmatic laser beam. The first and the second gradient index lenses have such refractive powers that both the fast and the slow axis of the astigmatic laser beam are converged to a focus inside the third gradient index lens.

21 Claims, 2 Drawing Sheets

Fig. 1 (Side View)

Fig. 2 (Top View)

GRIN-LENS ARRANGEMENT

FIELD OF THE INVENTION

The present invention generally relates to beam transformation of astigmatic optical radiation. More particularly, the present invention relates to a lens arrangement for symmetrization of divergent, generally astigmatic optical radiation and to a method of constructing such an arrangement of lenses.

BACKGROUND OF THE INVENTION

Solid state lasers that are optically pumped by diode lasers have gained an increased attention during the last years. Solid state lasers are often favored in comparison to diode lasers, because a much better beam quality is obtained from solid state lasers. In order for the optical pumping of a solid state laser to be efficient, it is important to match the beam size and beam shape of the pump beam to the size and shape of the transverse area of the lasing mode in the solid state laser. If the pump beam is larger than the lasing mode, there is a loss of energy because not all energy supplied by the optical pumping can be extracted into the lasing mode. For three-level or quasi three-level lasers, there is also a problem if the pump beam is smaller than the lasing mode. In this latter case, no gain is provided to the lasing mode outside the volume occupied by the pump beam, but instead absorption losses occur due to reabsorption of energy from the lasing mode.

For the above reasons, the size and shape of the pump beam in a diode pumped solid state laser have generally been adjusted in order to match the lasing mode of the solid state laser to the largest possible extent. To this end, various types of focusing arrangements have been employed.

One example of a beam shaper for shaping a beam from a diode laser for the purpose of pumping a solid state laser consists of a thick cylindrical lens that is arranged with its principal axes rotated 45 degrees with respect to the principal axes of the astigmatic diode beam. An arrangement of this type is sometimes called a "beam twister", and makes an initially astigmatic beam rotationally symmetric by beam twisting. A theoretical background to beam twisting by means of a thick cylindrical lens is given by Laabs et al. in the article "Twisting of three-dimensional Hermite-Gaussian beams", Journal of Modern Optics, 1999, vol. 46, no. 4, pp 709–719.

Diode lasers in general have very astigmatic emissions, with a highly elliptical beam (large difference in $M^2$-values). The dimension having the highest degree of divergence in the emission from a diode laser is referred to as the fast axis, and the dimension having the lowest degree of divergence is referred to as the slow axis. In order for the beam twister to function properly according to the above-mentioned theory for standard thick lenses, the fast and the slow axis must somehow be made to have similar Rayleigh lengths inside the beam twister. This is generally obtained by means of two intermediate cylindrical lenses arranged between the diode laser and the beam twister. The first of the two intermediate lenses converges the emission in the fast axis, and the second converges the emission in the slow axis. In this way, both the fast and the slow axis can be focused simultaneously inside the beam twister such that a rotationally symmetrical beam is ideally obtained behind the twister.

The above-mentioned arrangement for beam twisting has proven to be adequately effective in order to provide a beam for pumping of solid state lasers. However, the cylindrical lenses used makes the arrangement very bulky. Moreover, cumbersome alignment of each individual lens is usually required.

Therefore, there is a need for improved arrangements for shaping the output beam from a diode laser. In particular, there is a need for more compact arrangements for beam twisting an astigmatic beam into an ideally rotationally symmetric beam. More compact arrangements are particularly attractive for compact laser sources, where lower cost, automation of manufacturing, and simpler alignment of optical elements are some of the advantages. Furthermore, diode-pumped solid-state lasers are often incorporated as sub-assemblies in other instruments, further increasing the requirements on compactness. In addition, the beam of high rotational symmetry obtained by the present invention may be used directly for various purposes.

SUMMARY OF THE INVENTION

It is an object of the present invention to meet the need mentioned above, by providing a compact arrangement for symmetrization of an astigmatic laser beam.

More particularly, it is an object of the present invention to provide a compact lens arrangement for beam twisting of a divergent, generally astigmatic laser beam into an ideally rotationally symmetric beam (a beam having a high degree of rotational symmetry), which lens arrangement is based on gradient index lenses (GRIN-lenses).

Also, it is an object of the present invention to provide an arrangement for equalizing $M^2$-values of emission from a diode laser.

By way of introduction, some characteristics of a typical diode laser will be briefly discussed. A diode laser often emits light from an elongated bar or strip. The dimensions of the emitting bar may be about, for example, 1 μm×100 μm. Due to diffraction, the divergence of the emitted light is much greater parallel to the smaller dimension than it is parallel to the larger dimension. Hence, the output from a diode laser is typically a very divergent, astigmatic beam. The transverse axis of the emitted light parallel to the smaller dimension of the emitting bar is called the fast axis, because the divergence is larger in this direction (the light cone spreads faster). The transverse axis of the emitted light parallel to the larger dimension of the emitting bar is called the slow axis, because the divergence is smaller in this direction (the light cone spreads slower than in the former transverse direction).

As presented in the article by Laabs et al., mentioned in the background above, a Hermite-Gaussian beam (an astigmatic beam) can be transformed into a Laguerre-Gaussian beam (a rotationally symmetric beam) by a thick cylindrical lens (or two or more thin cylindrical lenses) having its principal axes rotated 45 degrees with respect to the principal axes of the astigmatic Hermite-Gaussian beam. In total, three or four lenses must be aligned simultaneously in the prior art arrangement. A requisite for the transformation to be successful is that the Rayleigh lengths of both transverse directions of the input beam are equal in the transforming cylindrical lens. If this condition is not met, the result is not a rotationally symmetric Laguerre-Gaussian beam, but rather some kind of astigmatic Hermite-Gaussian beam. According to the same article, this kind of transformation is also applicable to astigmatic beams with partial coherence and hence to the astigmatic output from a diode laser.

The present invention provides an improvement to the arrangement theoretically described by Laabs et al. by introducing gradient index lenses in a beam transformation arrangement of this kind. Notably, previous set-ups have employed standard curved lenses. Gradient lenses, both spherical and cylindrical, are per se well known in the art.

Going from standard lenses to gradient index lenses is not an easy task. One fundamental difference between standard lenses and gradient index lenses is that light is refracted at the surface interface in a standard lens, while refracted throughout the lens in a gradient index lens. Therefore, when constructing a system of gradient index lenses, the length and position of each lens is dependent upon the length and position of the other lenses, in a more complicated way than for standard lenses. There is no existing theory for beam twisting by means of gradient index lenses. Nevertheless, the inventors have found that it is possible to achieve beam twisting in a system of gradient index lenses.

However, the potential advantages of gradient index lens arrangements are very attractive. One very attractive feature is that the lenses may be arranged in close contact with each other, to form a substantially monolithic entity, thus allowing a much more compact lens system than is possible to obtain by standard lenses. Moreover, the outer, physical dimensions of gradient index lenses may be the same, even though the refractive powers of different lenses are different. In particular, a cylindrical gradient index lens having a refractive power in a first direction may be physically identical in its outer dimensions to a cylindrical gradient index lens having a refractive power in a second direction. This lack of curved lens surfaces may also facilitate mass-production of compact beam transforming arrangements. Moreover, the use of gradient index lenses provides for easier alignment of individual lenses in a lens arrangement.

According to the present invention, a new arrangement of lenses is provided for transforming a divergent, generally astigmatic laser beam into a rotationally symmetric beam. By the present invention, a high degree of rotational symmetry and substantially equal $M^2$-values for an initially astigmatic laser beam can be obtained. In addition, a method of constructing an arrangement of gradient index lenses for transforming a divergent, generally astigmatic laser beam into a rotationally symmetric beam is provided.

According to the invention, the arrangement of gradient index lenses comprises a first and a second converging cylindrical gradient index lens for converging the fast and slow axes, respectively, of a divergent laser beam to a focus, and a third cylindrical gradient index lens arranged with its principal axes at 45 degrees with respect to the first and the second lenses (and with respect to the principal axes of the astigmatic laser beam). Preferably, the first and the second lenses converge the divergent laser beam to a focus inside the third cylindrical gradient index lens.

In order to achieve the best possible transformation of the astigmatic beam into a rotationally symmetrical beam, it is assumed that, similar to the prior art arrangement, the Rayleigh lengths for the two principal axes of the astigmatic beam should be substantially equal for the focus inside the third lens. As known in the art, the Rayleigh length is the distance from the beam waist (the focus) where the beam diameter has increased by a factor of sqrt(2).

Furthermore, the third lens should have a refractive power that is appropriate for transformation into an ideally rotationally symmetrical beam. However, as will be clarified below, the transformed beam is not perfectly rotationally symmetric. Nevertheless, the beam is given a very high degree of rotational symmetry by means of the inventive arrangement. It is to be noted that the refractive power of a gradient index lens is a function of both the refractive index profile therein, and the length thereof. Typically, the refractive effect of a gradient index lens is adjusted by polishing or grinding the lens to an appropriate length.

BRIEF DESCRIPTION OF THE DRAWINGS

In the following detailed description of preferred embodiments, reference is made to the accompanying drawings, in which.

On the drawings, like parts are designated like reference numerals.

DESCRIPTION OF PREFERRED EMBODIMENTS

Figure 1:
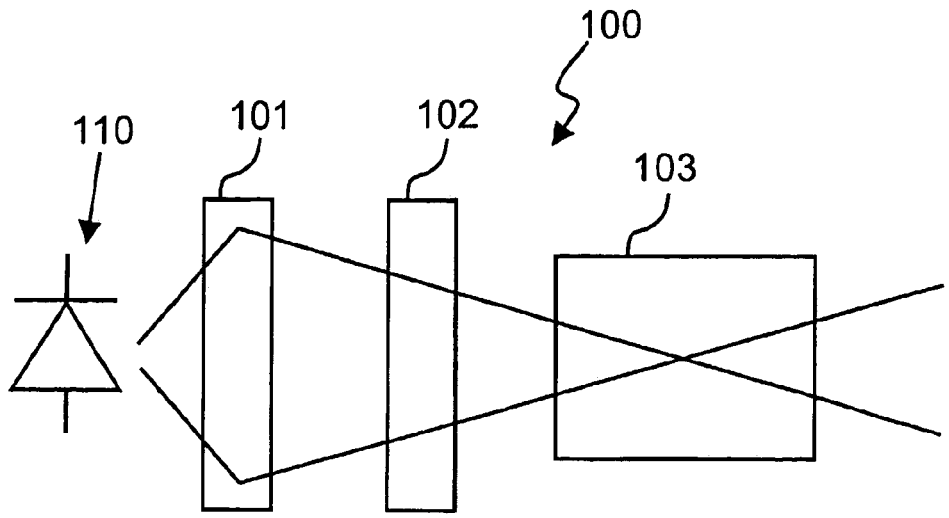
FIG. 1 is a schematic side view of an arrangement according to the invention.

An arrangement 100 according to the present invention generally comprises a first 101, a second 102 and a third 103 cylindrical gradient index lens. The lens arrangement 100 has an input side where a divergent, astigmatic-laser beam (e.g. from a diode laser 110) is to be received, and an output side where a transformed beam with a high degree of rotational symmetry is to be delivered. The first lens 101 is on the input side, and the third lens 103 is on the output side.

Figure 2:
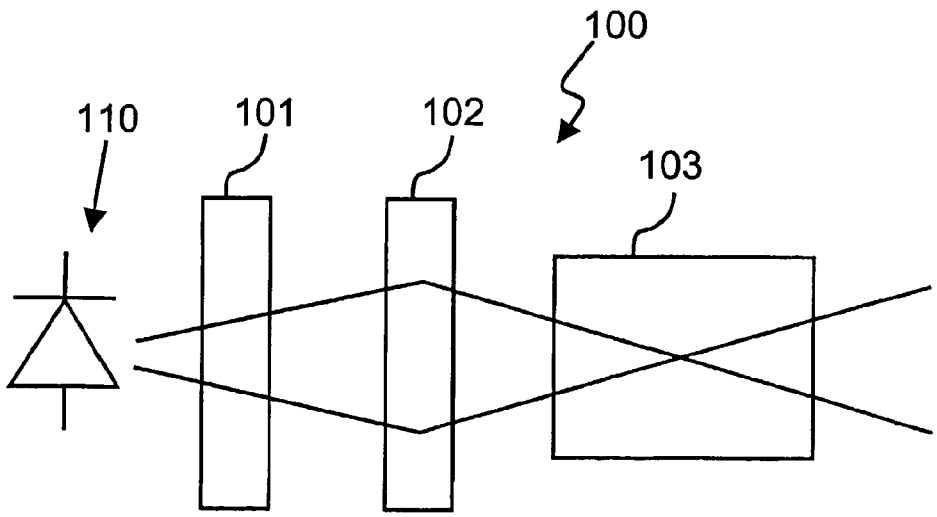
FIG. 2 is a schematic top view of the arrangement shown in FIG. 1.

In the following, the action of each of the three lenses will be described with reference to FIGS. 1 and 2, FIG. 1 showing a side view of the arrangement 100 and FIG. 2 showing a top view. In FIGS. 1 and 2, there is also shown a schematic diode laser 110 on the input side.

As indicated in FIG. 1, the first cylindrical GRIN-lens 101 has the task of converging the astigmatic laser beam in the fast axis (the most divergent axis). Since it is a cylindrical lens, there is no converging power along the slow axis, as can be seen from FIG. 2. The first lens converges the fast axis light to a focus inside the third cylindrical GRIN-lens 103, virtually without affecting the slow transverse direction. The second cylindrical lens 102, on the other hand, has the task of converging the astigmatic laser beam in the slow axis (the least divergent axis). Again, it being a cylindrical lens, there is no converging power in the fast axis, as illustrated in FIG. 1. Hence, the second lens 102 converges the slow axis light to a focus inside the third cylindrical GRIN-lens 103, virtually without affecting the fast transverse direction.

The first cylindrical GRIN-lens 101 is arranged with its principal axes parallel to the principal axes of the astigmatic beam and with its converging power in the fast direction. The second cylindrical lens 102 is also arranged with its principal axes parallel to the principal axes of the astigmatic beam, but with its converging power in the slow direction. Consequently, the first and the second lenses 101 and 102 are arranged at mutually orthogonal orientations.

The converging power of each of the first and the second lens is selected such that the fast axis and the slow axis have substantially equal Rayleigh lengths for the focus inside the third lens. This can be accomplished since the focusing lens for the fast axis (viz. the first lens 101) is closer to the diode laser than is the focusing lens for the slow axis (the second lens 102). This situation is illustrated in FIGS. 1 and 2.

The third lens 103 is also a cylindrical GRIN-lens. However, the third lens is arranged with its principal axes rotated 45 degrees with respect to the principal axes of the astigmatic beam, in line with the previously discussed beam twisting theory. When the astigmatic beam enters the third lens at 45 degrees, it undergoes a focusing that is different for different portions of the beam. Consequently, the beam cross-section exhibits a twisting effect in the third lens. The length of the third GRIN-lens 103 is adjusted such that the beam is optimally just rotationally symmetric when it exits said lens. If the third lens is too long or too short, the output beam after the lens will not be optimally rotationally symmetric (have a lower degree of rotational symmetry).

Figure 3:
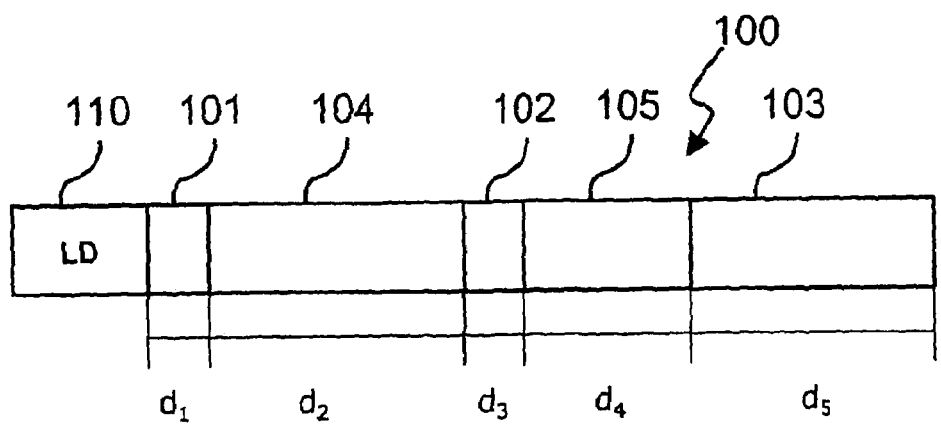
FIG. 3 is a schematic drawing of a monolithic lens arrangement according to the invention.

Turning now to FIG. 3 of the accompanying drawings, a preferred embodiment of the invention will be described in more detail.

The beam shaping arrangement 100 comprises a first, a second, and a third lens 101, 102, 103. The lenses are separated by spacers 104, 105, and all of the lenses as well as the spacers are bonded together to form a monolithic lens arrangement. On the input side of the arrangement, a laser diode package 110 is located. It is to be understood that the first lens of the lens arrangement need not be in physical contact with the laser diode package, but may be separated there from. The purpose of the lens arrangement is thus to transform the emission from the laser diode into an output beam on the output side that has a high degree of rotational symmetry (in contrast to the direct output from the laser diode). In this example, the laser diode is a 4 W diode commercially available from Sony, having an emitting area of 1 μm×200 μm.

Figure 4:
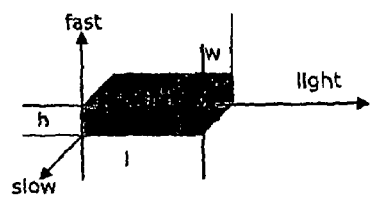
FIG. 4 illustrates the fast and slow axes in the arrangement, as well as the dimensions height (h), width (w) and length (l)

Reference is now made both to FIG. 3, showing the physical arrangement; and to FIG. 4, showing the geometry discussed below. The first lens 101 is the lens for converging the fast axis of the light from the laser diode. The dimensions of the first lens are (l, h, w) 1.1×1.3×0.5 mm³. Hence, the distance $d_1$=1.1 mm. The second lens 102 is the lens for converging the slow axis of the light from the laser diode. The dimensions of the second lens are 1.0×1.3×1.3 mm³. Hence., the distance $d_3$=1.0 mm. The first lens and the second lens are separated by a first spacer 104 having the dimensions 5.2×1.3×1.3 mm³ (distance $d_2$=5.2 mm). As mentioned earlier, the first and the second lenses are arranged such that their respective refracting powers are orthogonal.

The third lens 103 is the actual beam twisting lens. This lens is arranged with its principal axes at 45 degrees with respect to the first and the second lens. The dimensions of the third lens (the beam twister) are 4.4×1.3×1.3 mm³ (distance $d_5$=4.4 mm). The third lens is separated from the second lens by means of a second spacer 105 having the dimensions 4.1×1.3×1.3 mm³ (distance $d_4$=4.1 mm). Hence, the total length of the lens arrangement is 15.8 mm—a compact arrangement indeed.

As for the optical properties of the lenses 101, 102, 103 and the spacers 104, 105, they are as follows. The first lens has a nominal focal length of 0.48 mm (pitch=0.24). The refractive index at the center of the first lens is 1.62, and the lens has a constant refractive index gradient of 1.30 mm$^{-1}$. The second lens has a nominal focal length of 2.55 mm (pitch=0.08). The refractive index at the center is 1.62, and the refractive index gradient is constant at 0.51 mm$^{-1}$. The third lens (the beam twister) has a nominal focal length of 1.55 mm (pitch=0.36), a center refractive index of 1.62 and a constant index gradient of 0.51 mm$^{-1}$. The spacers, of course, have no refractive powers, and a refractive index of 1.62.

The lenses and spacers are bonded together by means of an optical glue, such that the monolithic arrangement is achieved.

Figure 5:
FIG. 5 shows a typical focal spot of a beam from a diode laser (a) without beam twisting, and (b) with beam twisting according to the invention.

For comparison, FIG. 5 shows the resulting focal spot in absence of the beam twister (FIG. 5*a*) and with the beam twister (FIG. 5*b*). For the situation shown in FIG. 5*a* (only focusing optics, no beam twister), the divergence in the fast axis is about 1/500 mrad and in the slow axis about 50/260 mrad. The focal spot achieved without any twister (third lens) is actually just an image of the emitting surface of the laser diode. As can be seen from FIG. 5*a*, this focal spot has a very low degree of rotational symmetry. Addition of the beam twister, as illustrated in FIG. 5*b*, gives equal divergences at 15/15 mrad in both lateral directions. The focal spot size in the case shown in FIG. 5*b* is about 100×100 μm, which is a reduction of spot size in the slow axis of about 40%.

Commercial laser diodes are sometimes provided with a collimating fiber lens on the emitting surface thereof. If such a laser diode is used, the first cylindrical lens of the arrangement according to the present invention can be left out, and the second lens can be replaced by a spherical lens arranged to converge both the fast and the slow axis of the emitted beam. Hence, in this case, the lens arrangement comprises a first fiber lens provided on the emitting surface of the laser diode for collimating/converging the fast axis of the emitted light, a second spherical gradient index lens for converging both the fast and the slow axis towards a focus in the third lens. As previously, the third lens is a cylindrical gradient index lens that is arranged with its principal axes at 45 degrees with respect to the fast and the slow axes of the emitted light. Furthermore, it is in some cases possible to use a cylindrical gradient index lens for the second lens also in this case.

In conclusion, it has been shown in the present description how the thick cylindrical lens beam twister described by Laabs et al. can be replaced by a single cylindrical gradient index lens. Moreover, it has been shown how the collecting (converging) lens system prior to the beam twister can be implemented by means of cylindrical gradient index lenses. One particularly attractive advantage of the present invention is that all the cylindrical lenses may be cemented together to form a substantially monolithic entity, wherein the individual lenses are separated from each other by means of glass spacers.

The invention claimed is:

1. A lens arrangement (100) for transforming a divergent, generally astigmatic laser beam from a diode laser (110) into a beam having a high degree of rotational symmetry, comprising in series:

a first cylindrical gradient index lens (101) arranged with its principal axes parallel to the principal axes of the astigmatic laser beam for converging the fast axis of the astigmatic laser beam;

a second cylindrical gradient index lens (102) arranged with its principal axes parallel to the principal axes of the astigmatic laser beam for converging the slow axis of the astigmatic laser beam; and a third cylindrical gradient index lens (103) arranged with its principal axes rotated 45 degrees with respect to the principal axes of the astigmatic laser beam for twisting the converged astigmatic laser beam into a beam having a high degree of rotational symmetry, wherein the first and the second gradient index lenses have such refractive powers that both the fast and the slow axis of the astigmatic laser beam are converged to a focus inside the third gradient index lens.

2. A lens arrangement as claimed in claim 1, wherein the refractive powers of the first and the second cylindrical gradient index lenses are matched such that the fast and the slow axes have substantially the same Rayleigh lengths for the focus inside the third gradient index lens.

3. A lens arrangement as claimed in claim 1, wherein the refractive powers of the first and the second lenses are such that the fast and the slow axis of the astigmatic laser beam are converged to a focus in the center of the third gradient index lens.

4. A lens arrangement as claimed in claim 1, wherein the first and the second lens, and the second and the third lens, are separated by means of a respective spacer (104, 105).

5. A lens arrangement as claimed in claim 4, wherein the spacers (104, 105) are made of glass having a refractive index similar to the central refractive index of the lenses (101, 102, 103).

6. A lens arrangement as claimed in claim 4, wherein the lenses and the spacers are bonded together to form a monolithic lens arrangement (100).

7. A method of manufacturing an arrangement (100) of gradient index lenses for transforming a divergent, generally astigmatic laser beam into a beam having a high degree of rotational symmetry, comprising the steps of:
arranging a first cylindrical gradient index lens (101) that is adapted to converge the fast axis of the divergent astigmatic beam;
arranging a second cylindrical gradient index lens (102) that is adapted to converge the slow axis of the divergent astigmatic beam; and
arranging a third cylindrical gradient index lens (103) with its principal axes at 45 degrees with respect to the principal axes of the astigmatic beam, said third cylindrical gradient index lens being adapted to twist the astigmatic beam into a rotationally symmetric beam,
wherein the first and the second lenses are adapted to focus the fast and slow axes, respectively, of the astigmatic beam to a focus inside the third lens.

8. A method as claimed in claim 7, wherein the focusing powers of the first and second lenses are matched by polishing the first and/or the second cylindrical gradient index lens to an appropriate length, such that the focusing powers of the first and the second lenses are matched to provide similar Rayleigh lengths for the fast and the slow axes at the focus inside the third lens.

9. A method as claimed in claim 7, further comprising the step of adjusting the length of the third gradient index lens to an appropriate length, in order to transform the focused astigmatic beam into a beam of high rotational symmetry after passage of the third lens.

10. A method as claimed in claim 9, wherein the length of the third gradient index lens is adjusted by polishing and/or grinding the lens to an appropriate length.

11. A method as claimed in claim 7, comprising the further steps of:
arranging a first spacer between the first and the second lens;
arranging a second spacer between the second and the third lens; and
bonding the spacers to the lenses to form a monolithic lens arrangement.

12. A method as claimed in claim 11, wherein the refractive index of each of the spacers is equal to the central refractive index of the lenses.

13. A lens arrangement as claimed in claim 2, wherein the refractive powers of the first and the second lenses are such that the fast and the slow axis of the astigmatic laser beam are converged to a focus is the center of the third gradient index lens.

14. A lens arrangement as claimed claim 2, wherein the first and the second lens, and the second and the third lens, are separated by means of a respective spacer (104, 105).

15. A lens arrangement as claimed claim 3, wherein the first and the second lens, and the second and the third lens, are separated by means of a respective spacer (104, 105).

16. A lens arrangement as claimed claim 13, wherein the first and the second lens, and the second and the third lens, are separated by means of a respective spacer (104, 105).

17. A lens arrangement as claimed in claim 5, wherein the lenses and the spacers are bonded together to form a monolithic lens arrangement (100).

18. A method as claimed in claim 8, further comprising the step of adjusting the length of the third gradient index lens to an appropriate length, in order to transform the focused astigmatic beam into a beam of high rotational symmetry after passage of the third lens.

19. A method as claimed in claim 8, comprising the further steps of:
arranging a first spacer between the first and the second lens;
arranging a second spacer between the second and the third lens; and
bonding the spacers to the lenses to form a monolithic lens arrangement.

20. A method as claimed in claim 9, comprising the further steps of:
arranging a first spacer between the first and the second lens;
arranging a second spacer between the second and the third lens; and
bonding the spacers to the lenses to form a monolithic lens arrangement.

21. A method as claimed in claim 10, comprising the further steps of:
arranging a first spacer between the first and the second lens;
arranging a second spacer between the second and the third lens; and
bonding the spacers to the lenses to form a monolithic lens arrangement.

* * * * *

UNITED STATES PATENT AND TRADEMARK OFFICE
CERTIFICATE OF CORRECTION

PATENT NO.         : 7,068,438 B2                                Page 1 of 1
APPLICATION NO. : 10/513821
DATED              : June 27, 2006
INVENTOR(S)       : Renée Hansson et al.

It is certified that error appears in the above-identified patent and that said Letters Patent is hereby corrected as shown below:

Title page, item (73) Assignee: should read --
"Cobalt AB, Stockholm (SE)" should read --Cobolt AB, Stockholm (SE)--.

Signed and Sealed this

Thirty-first Day of October, 2006

JON W. DUDAS
*Director of the United States Patent and Trademark Office*